United States Patent
Fang et al.

(10) Patent No.: US 10,156,670 B2
(45) Date of Patent: Dec. 18, 2018

(54) POLARIZING FILM HAVING SPECIFIED ZERO SHEAR VISCOSITY AND YIELD STRESS AND DISPLAY DEVICE INCLUDING THE SAME

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Feifei Fang, Suwon-si (KR); Beom Seok Kim, Seoul (KR); Seong-Jun Yoon, Yongin-si (KR); Dong Yun Lee, Suwon-si (KR); Boreum Jeong, Daejeon (KR); Myung Sup Jung, Seongnam-si (KR); Won Suk Chang, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 155 days.

(21) Appl. No.: 14/972,615

(22) Filed: Dec. 17, 2015

(65) Prior Publication Data
US 2016/0178820 A1    Jun. 23, 2016

(30) Foreign Application Priority Data

Dec. 17, 2014 (KR) .................. 10-2014-0182301
Dec. 9, 2015 (KR) .................. 10-2015-0175369

(51) Int. Cl.
*G02B 5/30* (2006.01)
*G02B 1/111* (2015.01)
(Continued)

(52) U.S. Cl.
CPC ............ *G02B 5/3083* (2013.01); *G02B 1/111* (2013.01); *G02B 5/3033* (2013.01); *G02B 1/08* (2013.01);
(Continued)

(58) Field of Classification Search
CPC .. G02B 1/08; G02B 1/11; G02B 1/111; G02B 5/3025; G02B 5/3033; G02B 5/305;
(Continued)

(56) References Cited

U.S. PATENT DOCUMENTS

| | | | |
|---|---|---|---|
| 5,430,565 A | 7/1995 | Yamanouchi et al. | |
| 6,225,404 B1 * | 5/2001 | Sorensen | C08G 81/00 525/54.1 |

(Continued)

FOREIGN PATENT DOCUMENTS

| | | |
|---|---|---|
| CN | 1223675 A | 7/1999 |
| CN | 103809234 A | 5/2014 |

(Continued)

OTHER PUBLICATIONS

Office Action dated Jun. 22, 2018, of the corresponding Chinese Patent Application No. 201510954880.0 with English Translation.

*Primary Examiner* — Stephone B Allen
*Assistant Examiner* — Ryan S Dunning
(74) *Attorney, Agent, or Firm* — Cantor Colburn LLP

(57) ABSTRACT

A polarizing film includes a high-temperature elongation film of a polyolefin and a dichroic dye, and the polyolefin has zero shear viscosity ($\eta_0$) ranging from about 2600 Pa·s to about 17400 Pa·s at a temperature of about 210° C. (±3° C.).

35 Claims, 5 Drawing Sheets

(51) Int. Cl.
  *G02B 1/08* (2006.01)
  *G02B 1/11* (2015.01)
  *G02F 1/17* (2006.01)
  *G02F 1/1335* (2006.01)

(52) U.S. Cl.
  CPC ............... *G02B 1/11* (2013.01); *G02B 5/305* (2013.01); *G02B 5/3008* (2013.01); *G02B 5/3025* (2013.01); *G02F 1/133528* (2013.01); *G02F 1/172* (2013.01)

(58) Field of Classification Search
  CPC .. G02B 5/3083; G02F 1/172; G02F 1/133528
  USPC .......... 252/585; 359/487.01, 487.02, 487.05, 359/487.06, 601, 602, 603; 427/163.1; 428/1.31
  See application file for complete search history.

(56) References Cited

U.S. PATENT DOCUMENTS

| | | | |
|---|---|---|---|
| 6,294,632 B1 | 9/2001 | Shiraishi et al. | |
| 7,852,561 B2 | 12/2010 | Chiba et al. | |
| 7,989,036 B2 | 8/2011 | Harris et al. | |
| 8,159,639 B2 | 4/2012 | Yanai et al. | |
| 8,343,628 B2 | 1/2013 | Fukuda et al. | |
| 8,475,931 B2 | 7/2013 | Sugino et al. | |
| 8,796,404 B2 | 8/2014 | Kim et al. | |
| 8,932,688 B2 | 1/2015 | Seo et al. | |
| 9,194,980 B2 | 11/2015 | Lee et al. | |
| 9,207,359 B2 | 12/2015 | Lee et al. | |
| 2004/0096666 A1* | 5/2004 | Knox | B32B 27/08 428/412 |
| 2008/0138541 A1* | 6/2008 | Moto | G02B 5/3033 428/1.1 |
| 2010/0062189 A1 | 3/2010 | Yosomiya et al. | |
| 2012/0050652 A1 | 3/2012 | Chang et al. | |
| 2013/0141785 A1 | 6/2013 | Lee et al. | |
| 2013/0172501 A1 | 7/2013 | Jung et al. | |
| 2013/0172503 A1 | 7/2013 | Kim et al. | |
| 2013/0285938 A1 | 10/2013 | Kang et al. | |
| 2013/0301129 A1 | 11/2013 | In et al. | |
| 2013/0303677 A1 | 11/2013 | Kim et al. | |
| 2014/0043684 A1 | 2/2014 | Kim et al. | |
| 2014/0124714 A1 | 5/2014 | Lee et al. | |
| 2014/0126053 A1 | 5/2014 | Won et al. | |
| 2014/0131643 A1 | 5/2014 | Lee et al. | |
| 2014/0185267 A1 | 7/2014 | Kim et al. | |
| 2014/0254012 A1 | 9/2014 | Moon et al. | |
| 2014/0334001 A1 | 11/2014 | Oh et al. | |
| 2014/0339482 A1 | 11/2014 | Lee et al. | |
| 2014/0347613 A1 | 11/2014 | Kim et al. | |
| 2015/0093521 A1 | 4/2015 | Chang et al. | |

FOREIGN PATENT DOCUMENTS

| | | |
|---|---|---|
| EP | 0110205 | 9/1983 |
| JP | 56-104984 | 8/1981 |
| JP | 3086363 | 7/2000 |
| JP | 3836283 | 8/2006 |
| JP | 200858768 | 3/2008 |
| JP | 2008291204 | 12/2008 |
| JP | 2009204725 | 9/2009 |
| JP | 2009244860 | 10/2009 |
| JP | 201148311 | 3/2011 |
| JP | 2013109090 | 6/2013 |
| KR | 20000067982 | 11/2000 |
| KR | 1020100007133 | 1/2010 |
| KR | 1020120021184 | 3/2012 |
| KR | 1020130062180 | 6/2013 |
| KR | 1020130072046 | 7/2013 |
| KR | 1020130075355 | 7/2013 |
| KR | 1020130076236 | 7/2013 |
| KR | 1020130093765 | 8/2013 |
| KR | 1020130120721 | 11/2013 |
| KR | 1020130121450 | 11/2013 |
| KR | 1020130125325 | 11/2013 |
| KR | 1020130126524 | 11/2013 |
| KR | 1020140021747 | 2/2014 |
| KR | 1020140058386 | 5/2014 |
| KR | 1020140059145 | 5/2014 |
| KR | 1020140085130 | 7/2014 |
| KR | 1020140111550 | 9/2014 |
| KR | 1020140133732 | 11/2014 |
| KR | 1020140134510 | 11/2014 |
| KR | 1020140139666 | 12/2014 |

* cited by examiner

POLARIZING FILM HAVING SPECIFIED ZERO SHEAR VISCOSITY AND YIELD STRESS AND DISPLAY DEVICE INCLUDING THE SAME

CROSS REFERENCE TO RELATED APPLICATIONS

This application claims priority to Korean Patent Application No. 10-2014-0182301, filed in the Korean Intellectual Property Office on Dec. 17, 2014, and all the benefits accruing therefrom under 35 U.S.C. § 119, the content of which is incorporated herein in its entirety by reference.

BACKGROUND

1. Field

A polarizing film and a display device including the polarizing film are disclosed.

2. Description of the Related Art

A display device such as a liquid crystal display (LCD) and an organic light emitting diode (OLED) includes a polarizing plate attached to the outside of the display panel. The polarizing plate only transmits light of a specific wavelength and absorbs or reflects light of any other wavelength, thereby controlling the direction of incident light on the display panel or light emitted from the display panel.

The polarizing plate generally includes a polarizer and a protective layer for the polarizer. The polarizer may be formed of, for example, polyvinyl alcohol and the protective layer may be formed of, for example, triacetyl cellulose (TAC).

However, the process of fabrication of the polarizing plate including the polarizer and the protective layer is not only complicated and expensive, but also results in production of a thick polarizing plate which leads to an increased thickness of a display device. Accordingly, there remains a need for a polarizing film that does not require a protective layer.

SUMMARY

An embodiment provides a polarizing film having improved orientation of a dichroic dye at high-temperature elongation without migration of the dichroic dye, and having high polarization efficiency and transmittance and excellent workability.

Another embodiment provides a display device including the polarizing film.

Yet another embodiment provides a composition for a polarizing film.

According to some embodiments, a polarizing film includes a high-temperature elongation film of a polyolefin and a dichroic dye, wherein the polyolefin has zero shear viscosity ($\eta_0$) of about 2600 Pa·s to about 17400 Pa·s, for example about 2600 Pa·s to about 12000 Pa·s, for another example about 2600 Pa·s to about 8500 Pa·s, at a temperature of about 210° C. (±3° C.).

The polyolefin may have complex viscosity ($\eta'$) satisfying Equation 1.

$$\frac{2600}{1+(k_1\omega)^{m_1}} \leq \eta^* \leq \frac{17400}{1+(k_2\omega)^{m_2}} \qquad \text{Equation 1}$$

In Equation 1,
$\omega$ is an angular frequency of a rotational rheometer, $k_1$ is a constant of about 0.108 to about 0.132, $k_2$ is a constant of about 0.738 to about 0.902, $m_1$ ranges from about 0.477 to about 0.583, and $m_2$ ranges from about 0.522 to about 0.638.

For example, the polyolefin may have complex viscosity satisfying Equation 1-1 or Equation 1-2.

$$\frac{2600}{1+(k_1\omega)^{m_1}} \leq \eta^* \leq \frac{12000}{1+(k_2\omega)^{m_2}} \qquad \text{Equation 1-1}$$

In Equation 1-1,
$\omega$ is an angular frequency of a rotational rheometer, $k_1$ is a constant of about 0.108 to about 0.132, $k_2$ is a constant of about 1.071 to about 1.309, $m_1$ ranges from about 0.477 to about 0.583, and $m_2$ ranges from about 0.468 to about 0.572.

$$\frac{2600}{1+(k_1\omega)^{m_1}} \leq \eta^* \leq \frac{8500}{1+(k_2\omega)^{m_2}} \qquad \text{Equation 1-2}$$

In Equation 1-2,
$\omega$ is an angular frequency of a rotational rheometer, $k_1$ is a constant of about 0.108 to about 0.132, $k_2$ is a constant of about 0.603 to about 0.737, $m_1$ ranges from about 0.477 to about 0.583, and $m_2$ ranges from about 0.54 to about 0.66.

The polyolefin may have yield stress of about 2600 Pa to about 8700 Pa.

The polyolefin may include polypropylene, a polyethylene copolymer, a polypropylene copolymer, a polyethylene-polypropylene copolymer, or a mixture thereof.

The polyolefin may be a mixture of polypropylene and a polyethylene-polypropylene (PE-PP) copolymer, and the polyethylene-polypropylene (PE-PP) copolymer may have an ethylene content of about 1 percent by weight (wt %) to about 50 wt %.

The polyolefin may have a melt flow index (MFI) of about 3 grams per 10 minutes (g/10 min) to 11 g/10 min.

The polypropylene may have a melt flow index of about 3 g/10 min to about 10 g/10 min, and the polyethylene-polypropylene copolymer may have a melt flow index of about 5 g/10 min to about 16 g/10 min.

The polyolefin may include the polypropylene and the polyethylene-polypropylene copolymer in a weight ratio of about 1:9 to about 9:1.

The dichroic dye may be dispersed in the polyolefin, and the polyolefin may be elongated in a uniaxial direction at an elongation rate of about 400 to about 1,300%.

The polarizing film may have haze ranging from less than or equal to about 5%, for example about 0.5% to about 4.5%, for another example about 0.5% to about 3.5%.

The polarizing film may have a dichroic ratio of about 2 to about 14 in a visible ray wavelength region of about 380 nm to about 780 nm.

The dichroic dye may be included in an amount of about 0.1 to 10 parts by weight, for example about 0.5 to 5 parts by weight, based on 100 parts by weight of the polyolefin.

The polarizing film may have polarization efficiency of greater than or equal to about 95%, for example about 95% to about 99.9%.

According to another embodiment, an anti-reflective film including the polarizing film and a phase retardation film is provided.

According to another embodiment, a display device including the polarizing film is provided.

According to yet another embodiment, a display device including the anti-reflective film is provided.

According to yet another embodiment, a composition for a polarizing film includes a polyolefin and a dichroic dye, wherein the polyolefin has zero shear viscosity ($\eta_0$) of about 2600 Pa·s to about 17400 Pa·s, for example about 2600 Pa·s to about 12000 Pa·s, for another example about 2600 Pa·s to about 8500 Pa·s, at a temperature of about 210° C. (±3° C.).

The polyolefin may have complex viscosity ($\eta'$) satisfying Equation 1.

$$\frac{2600}{1+(k_1\omega)^{m_1}} \leq \eta^* \leq \frac{17400}{1+(k_2\omega)^{m_2}} \qquad \text{Equation 1}$$

In Equation 1, $\omega$ is an angular frequency of a rotational rheometer, $k_1$ is a constant of about 0.108 to about 0.132, $k_2$ is a constant of about 0.738 to about 0.902, $m_1$ ranges from about 0.477 to about 0.583, and $m_2$ ranges from about 0.522 to about 0.638.

For example, the polyolefin may have complex viscosity satisfying Equation 1-1 or Equation 1-2.

$$\frac{2600}{1+(k_1\omega)^{m_1}} \leq \eta^* \leq \frac{12000}{1+(k_2\omega)^{m_2}} \qquad \text{Equation 1-1}$$

$$\frac{2600}{1+(k_1\omega)^{m_1}} \leq \eta^* \leq \frac{8500}{1+(k_2\omega)^{m_2}} \qquad \text{Equation 1-2}$$

In Equation 1-1, $\omega$ is an angular frequency of a rotational rheometer, $k_1$ is a constant of about 0.108 to about 0.132, $k_2$ is a constant of about 1.071 to about 1.309, $m_1$ ranges from about 0.477 to about 0.583, and $m_2$ ranges from about 0.468 to about 0.572.

In Equation 1-2, $\omega$ is an angular frequency of a rotational rheometer, $k_1$ is a constant of about 0.108 to about 0.132, $k_2$ is a constant of about 0.603 to about 0.737, $m_1$ ranges from about 0.477 to about 0.583, and $m_2$ ranges from about 0.54 to about 0.66.

The polyolefin may have yield stress of about 2600 Pa to about 8700 Pa, for example about 2691 Pa to about 8681 Pa.

The polarizing film may have haze ranging from less than or equal to about 5%, for example about 0.5% to about 4.5%, for another example about 0.5% to about 3.5%.

The polyolefin may include polypropylene, a polyethylene copolymer, a polypropylene copolymer, a polyethylene-polypropylene copolymer, or a mixture thereof.

The polyolefin may be a mixture of polypropylene and a polyethylene-polypropylene copolymer, and the polyethylene-polypropylene copolymer may have an ethylene content of about 1 to about 50 wt %.

The polyolefin may have a melt flow index of about 3 g/10 min to about 11 g/10 min.

The polypropylene may have a melt flow index of about 3 g/10 min to about 10 g/10 min, and the polyethylene-polypropylene copolymer may have a melt flow index of about 5 g/10 min to about 16 g/10 min.

The polyolefin may include the polypropylene and the polyethylene-polypropylene copolymer in a weight ratio of about 1:9 to about 9:1.

The polarizing film may have a dichroic ratio of about 2 to about 14 in a visible ray wavelength region of about 380 nm to about 780 nm.

The dichroic dye may be included in an amount of about 0.1 to 10 parts by weight, for example about 0.5 to 5 parts by weight, based on 100 parts by weight of the polyolefin.

The composition for a polarizing film may have a solid content of greater than or equal to about 90 wt %.

In some embodiments, the composition for a polarizing film is prepared without added solvent.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
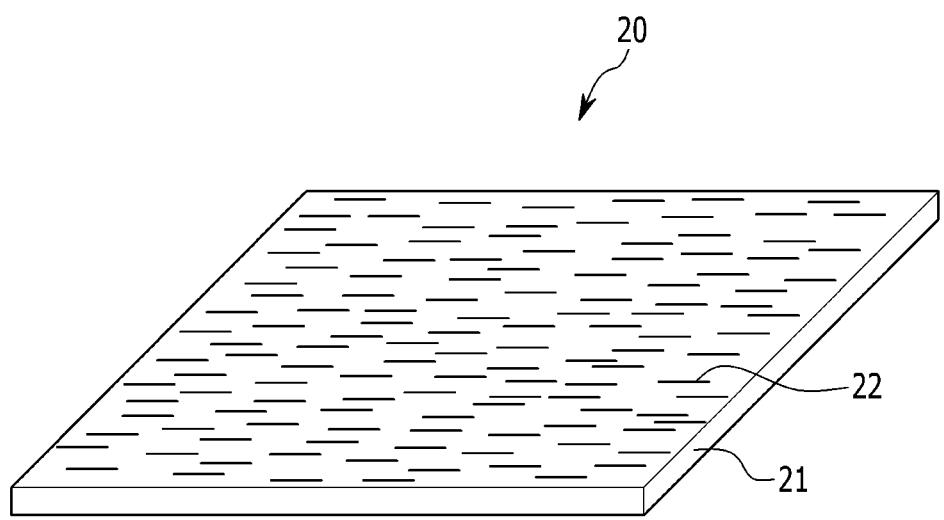
FIG. 1 is a schematic view showing a polarizing film according to an embodiment.

Exemplary embodiments will hereinafter be described in detail, and may be easily performed by those who have common knowledge in the related art. However, this disclosure may be embodied in many different forms and is not construed as limited to the exemplary embodiments set forth herein; rather, these embodiments are provided so that this disclosure will fully convey the scope of the disclosure to those skilled in the art. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept.

Expressions such as "at least one of," when preceding a list of elements, modify the entire list of elements and do not modify the individual elements of the list. Unless otherwise defined, all terms used in the specification (including technical and scientific terms) may be used with meanings commonly understood by a person having ordinary knowledge in the art to which this invention belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As stated above, unless specifically described to the contrary, a singular form includes a plural form, and is not to be construed as limited to the exemplary embodiments set forth herein.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to a compound or functional group wherein at least one hydrogen of the compound or functional group is replaced with at least one substituent selected from a halogen (F, Br, Cl, or I), a C1 to C20 alkoxy group, a cyano group, an amino group, a C1 to C20 ester group, a C1 to C20 alkyl group, a C6 to C20 aryl group, a C2 to C20 alkenyl group, a C2 to C20 alkynyl group, and a combination thereof.

Technology for manufacturing a thin polarizing film needing no protective layer by high temperature-elongating a mixture of a polyolefin and a dichroic dye is known. However, depending on the viscosity of the polyolefin, such technology results in a polarizing film having deteriorated properties. For example, when the viscosity of the polyolefin is increased, the alignment of the dichroic dye is improved, but workability during manufacture of the film is deteriorated due to the difficulty of compounding the polyolefin and forming the film through extrusion. On the other hand, when the viscosity of the polyolefin is decreased, workability may be satisfactory, but the alignment of the dichroic dye may be deteriorated due to migration of the dichroic dye. Accordingly, the viscosity of the polyolefin should be appropriately adjusted in order to improve haze and workability of the polarizing film and alignment and migration of the dichroic dye.

In an embodiment, a polyolefin having zero shear viscosity ($\eta_0$) within a predetermined range is used for a polarizing film, and thus may improve optical properties of the polarizing film such as polarizing efficiency, haze, and the like, while at the same time reducing migration of the dichroic dye and improving alignment of the dichroic dye. Such materials can further secure excellent workability of the film during the manufacturing process.

Hereinafter, a polarizing film according to an embodiment is described referring to drawings.

FIG. 1 is a schematic view showing a polarizing film according to an embodiment.

Referring to FIG. 1, a polarizing film 20 according to an embodiment includes a high-temperature elongation film of a polyolefin 21 and a dichroic dye 22. The polyolefin 21 and the dichroic dye 22 provide a single film having an integrated structure of the polyolefin 21 and the dichroic dye 22 through a high-temperature elongation process.

The polyolefin 21 has zero shear viscosity ($\eta_0$) of about 2600 Pa·s to about 17400 Pa·s, for example about 2600 Pa·s to about 12000 Pa·s, for another example about 2600 Pa·s to about 8500 Pa·s, at a temperature of about 210° C. (±3° C.).

When the zero shear viscosity is within the range, a polarizing film having excellent optical properties such as polarization efficiency, haze, and the like and excellent workability is provided by minimizing migration of a dichroic dye and improving alignment of the dichroic dye.

The zero shear viscosity indicates viscosity at an angular frequency of 0, and is a parameter obtained through an analysis program installed in a rotational rheometer with data points of frequency sweep measured in an angular frequency range by using the rotational rheometer.

The frequency sweep is measured at 210° C. (±3° C.) by using the rotational rheometer and setting it to have a gap of about 1.0 mm between upper and lower plates, a diameter of a rotary plate of about 8 mm, and strain of about 1%.

The rotational rheometer may be a viscoelasticity measuring device, Physica MCR 501 (Anton Paar Corp. Germany).

The polyolefin 21 may have complex viscosity (η') satisfying Equation 1.

$$\frac{2600}{1+(k_1\omega)^{m_1}} \leq \eta^* \leq \frac{17400}{1+(k_2\omega)^{m_2}} \qquad \text{Equation 1}$$

In Equation 1,
ω is an angular frequency of a rotational rheometer, $k_1$ is a constant of about 0.108 to about 0.132, $k_2$ is a constant of about 0.738 to about 0.902, $m_1$ ranges from about 0.477 to about 0.583, and $m_2$ ranges from about 0.522 to about 0.638.

Figure 6:
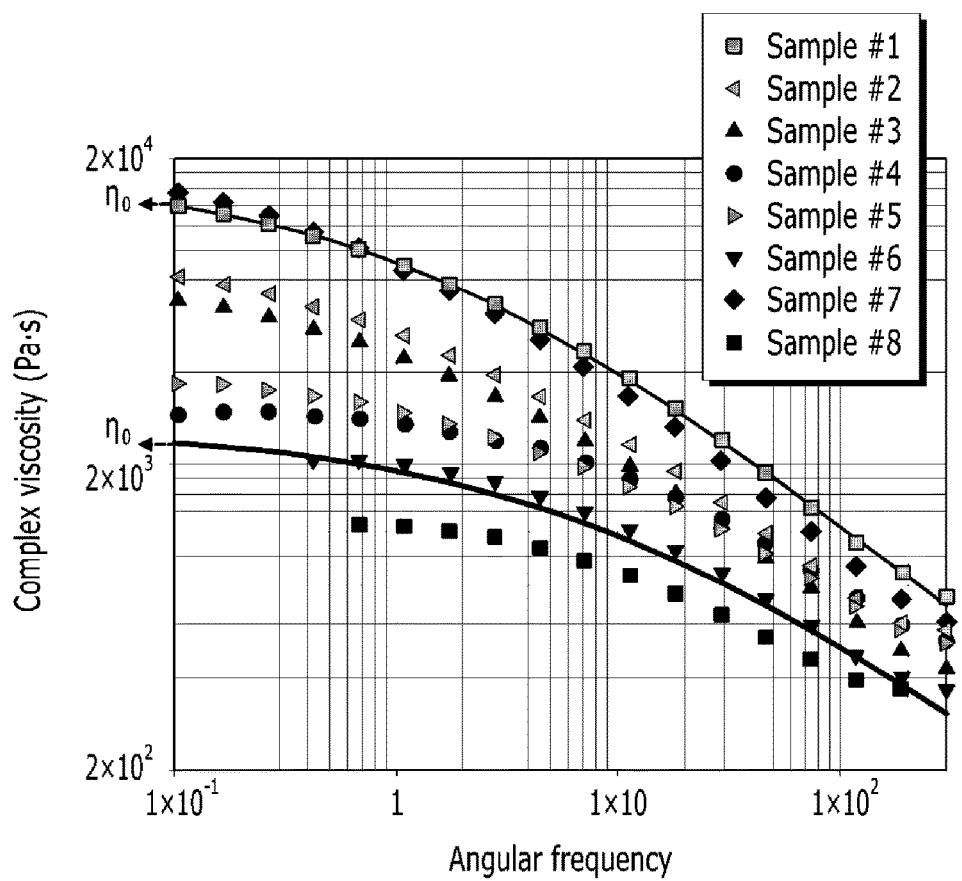
FIG. 6 is a graph showing viscosity profiles of polyolefins according to sample numbers 1 to 8.

The viscosity profiles satisfying the Equation 1 are shown in FIG. 6. FIG. 6 shows viscosity profiles of polyolefins having zero shear viscosity of about 2600 Pa·s ($\eta_0$) to about 17400 Pa·s ($\eta_0$). The complex viscosity satisfying the Equation 1 is positioned within the two solid lines, including the upper solid line and the lower solid line in FIG. 6.

For example, the polyolefin 21 may have complex viscosity satisfying Equation 1-1 or Equation 1-2.

$$\frac{2600}{1+(k_1\omega)^{m_1}} \leq \eta^* \leq \frac{12000}{1+(k_2\omega)^{m_2}} \qquad \text{Equation 1-1}$$

$$\frac{2600}{1+(k_1\omega)^{m_1}} \leq \eta^* \leq \frac{8500}{1+(k_2\omega)^{m_2}} \qquad \text{Equation 1-2}$$

In Equation 1-1,
ω is an angular frequency of a rotational rheometer, $k_1$ is a constant of about 0.108 to about 0.132, $k_2$ is a constant of about 1.071 to about 1.309, $m_1$ ranges from about 0.477 to about 0.583, and $m_2$ ranges from about 0.468 to about 0.572.

In Equation 1-2,
ω is an angular frequency of a rotational rheometer, $k_1$ is a constant of about 0.108 to about 0.132, $k_2$ is a constant of about 0.603 to about 0.737, $m_1$ ranges from about 0.477 to about 0.583, and $m_2$ ranges from about 0.54 to about 0.66.

The polyolefin 21 may have yield stress of about 2600 Pa to about 8700 Pa, for example about 2691 Pa to about 8681 Pa. When the yield stress is within this range, a polarizing film having excellent optical properties such as polarization efficiency, haze, and the like and excellent film workability may be provided by reducing migration of a dichroic dye and improving alignment of the dichroic dye.

The polarization film 20 may have haze ranging from less than or equal to about 5%, for example about 0.5% to about 4.5%, for another example about 0.5% to about 3.5%. When the polarizing film 20 made of the polyolefin 21 has haze within the range, transmittance may be increased, and thus excellent optical properties may be secured.

The polyolefin 21 may have crystallinity of less than or equal to about 50%, specifically about 30% to about 50%. When the polyolefin has crystallinity within the range, haze may be lowered and excellent optical properties may be obtained.

The polyolefin 21 may include polypropylene (PP), a polyethylene copolymer, a polypropylene copolymer, a polyethylene-polypropylene (PE-PP) copolymer, or a mixture thereof. The copolymer may further include another alphaolefin monomer unit in addition to ethylene monomer unit or propylene monomer unit. In an embodiment, such additional alphaolefin monomer unit may be derived from monomers selected from 1-butene, 2-butene, 3-methylbutene, 1-pentene, 4-methylpentene, 1-hexene, 1-octene, 1-decene, 1-octadecene and mixtures thereof.

The polyolefin 21 may be a mixture of polypropylene and a polyethylene-polypropylene copolymer, and the polyethylene-polypropylene copolymer may include an ethylene group at about 1 to 50 wt %, for example about 1 wt % to about 25 wt %. When the polyethylene-polypropylene copolymer includes the polyethylene within the range, phase separation of the polypropylene and the polyethylene-polypropylene copolymer may be effectively prevented or suppressed. In addition, the polyethylene-polypropylene copolymer may increase an elongation rate during the process of elongation, and may have excellent light transmittance and orientation, thus improving polarization characteristics.

The polyolefin 21 may have a melt flow index of about 3 g/10 min to about 11 g/10 min, for example about 4 g/10 min to about 11 g/10 min, for another example about 5 g/10 min to about 11 g/10 min considering dye orientation and migration phenomena, and good workability of the polyolefin.

Herein, the melt flow index shows the amount of a polymer in a melt state flowing per 10 minutes, and relates to viscosity of the polymer in a melted state. In other words, as the melt flow index (MFI) is lower, the polymer has higher viscosity, while as the melt flow index (MFI) is higher, the polymer has lower viscosity. When the polyolefin 21 has a melt flow index within the range, properties of a final product as well as workability may be effectively improved.

The polypropylene may have a melt flow index ranging from about 3 g/10 min to about 10 g/10 min, and the polyethylene-polypropylene copolymer may have a melt flow index ranging from about 5 g/10 min to about 16 g/10 min. When the polypropylene and the polyethylene-polypropylene copolymer have a melt flow index (MFI) within the range, properties of a final product as well as workability may be effectively improved.

The polyolefin 21 may include the polypropylene and the polyethylene-polypropylene copolymer in a weight ratio of about 1:9 to about 9:1, for example about 7:3 to about 3:7, for another example about 4:6 to about 6:4, and for another example about 5:5. When the polypropylene and the polyethylene-polypropylene copolymer are included within the range, the polypropylene may be prevented from being crystallized and may have excellent mechanical strength, thus effectively improving the haze characteristics.

The polyolefin 21 is elongated in a uniaxial direction. The uniaxial direction may be same as the length direction of the dichroic dye 22.

The dichroic dye 22 is dispersed into the polyolefin 21, and is aligned in the elongation direction of the polyolefin 21. The dichroic dye 22 is a material that transmits one perpendicular polarization component of two perpendicular polarization components in a predetermined wavelength region.

The dichroic dye 22 may include, for example, a compound having a molecular backbone selected from an azo compound, an anthraquinone compound, a phthalocyanine compound, an azomethine compound, an indigoid or thioindigoid compound, a merocyanine compound, a 1,3-bis(dicyanomethylene)indan compound, an azulene compound, a quinophthalonic compound, a triphenodioxazine compound, an indolo[2,3,b]quinoxaline compound, an imidazo[1,2-b]-1,2,4 triazine compound, a tetrazine compound, a benzo compound, a naphtoquinone compound, or a combination thereof.

The azo compound may be, for example, a compound represented by Chemical Formula 1.

Chemical Formula 1

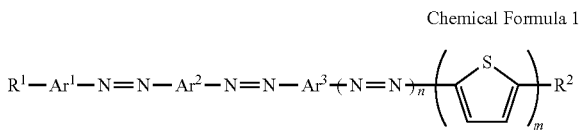

In Chemical Formula 1, $Ar^1$ to $Ar^3$ are each independently a substituted or unsubstituted C6 to C15 arylene group, $R^1$ is a substituted or unsubstituted C1 to C30 aliphatic organic group, a substituted or unsubstituted C6 to C30 aromatic organic group, a substituted or unsubstituted C1 to C30 hetero aliphatic organic group, a substituted or unsubstituted C3 to C30 hetero aromatic organic group, or a combination thereof, $R^2$ is hydrogen, a substituted or unsubstituted C1 to C30 aliphatic organic group, a substituted or unsubstituted C6 to C30 aromatic organic group, a substituted or unsubstituted C1 to C30 hetero aliphatic organic group, a substituted or unsubstituted C3 to C30 hetero aromatic organic group, a substituted or unsubstituted amino group, or a combination thereof, and n and m are independently 0 or 1.

In Chemical Formula 1, $Ar^1$ to $Ar^3$ may include, for example, a substituted or unsubstituted phenylene group, a substituted or unsubstituted naphthalene group, or a substituted or unsubstituted biphenylene group. Herein, the substituted phenylene group, the substituted naphthalene group, and the substituted biphenylene group may be, for example, substituted with a substituted or unsubstituted C1 to C20 alkyl group, a substituted or unsubstituted C1 to C20 alkoxy group, a halogen, a halogen-containing group, or a combination thereof.

In Chemical Formula 1, $R^1$ is a substituted or unsubstituted C1 to C30 alkyl group, a substituted or unsubstituted C1 to C20 alkoxy group, a substituted or unsubstituted C1 to C20 thioalkyl group, $-C(=O)R^a$ (where $R^a$ is a substituted or unsubstituted C1 to C30 alkyl group), $-OC(=O)R^b$ (where $R^b$ is a substituted or unsubstituted C1 to C30 alkyl group), a substituted or unsubstituted C2 to C20 alkenyl group, a substituted or unsubstituted C2 to C30 alkynyl group, or a combination thereof, $R^2$ is hydrogen, a substituted or unsubstituted C1 to C30 alkyl group, a substituted or unsubstituted C6 to C20 aryl group, C1 to C20 alkoxy group, a substituted or unsubstituted C1 to C20 thioalkyl group, $-NR^3R^4$, or a combination thereof, wherein $R^3$ and $R^4$ are each independently hydrogen, a substituted or unsubstituted C1 to C10 alkyl group, or are linked to each other to provide a ring.

The dichroic dye 22 may have a decomposition temperature of greater than or equal to about 245° C. Herein, the decomposition temperature indicates a temperature where the weight of the dichroic dye 22 decreases by about 5% relative to its initial weight.

The dichroic dye 22 may be included in an amount of about 0.1 to about 10 parts by weight, for example about 0.5 to about 5 parts by weight, based on 100 parts by weight of the polyolefin 21. When the dichroic dye is included within the range, sufficient polarization characteristics may be obtained without deteriorating transmittance of a polarizing film.

The polarizing film 20 may have a dichroic ratio of greater than or equal to about 2 to about 14, for example about 3 to about 10, at a maximum absorption wavelength ($\lambda_{max}$) in a visible ray region. Herein, the dichroic ratio may be calculated by dividing plane polarization absorbance in a direction perpendicular to the axis of a polymer by polarization absorbance in a horizontal direction according to Equation 2.

$$DR = Log(1/T_\perp)/Log(1/T_{//}) \qquad \text{Equation 2}$$

In Equation 2,

DR denotes a dichroic ratio of a polarizing film, $T_{||}$ is light transmittance of light entering parallel to the transmissive axis of a polarizing film, and $T_\perp$ is light transmittance of light entering perpendicular to the transmissive axis of the polarizing film.

The dichroic ratio shows to what degree the dichroic dye 22 is arranged in the polarizing film 20 in one direction. When the polarizing film 20 has a dichroic ratio within the range in a visible ray wavelength region, the dichroic dye 22 is arranged according to arrangement of polymer chains, improving polarization characteristics of the polarizing film 20.

The polarizing film 20 may have haze ranging from less than or equal to about 5%, for example about 0.5% to about 4.5%, for another example about 0.5% to about 3.5%. When the polarizing film 20 has haze within the range, transmittance may be increased, and thus excellent optical properties may be secured.

The polarizing film 20 may have polarization efficiency of greater than or equal to about 95%, for example about 95% to about 99.9%. Herein, the polarization efficiency refers to polarization efficiency at light transmittance of about 42%, and may be obtained by Equation 3.

$$PE (\%) = [(T_{||}-T_\perp)/(T_{||}+T_\perp)]^{1/2} \times 100 \qquad \text{Equation 3}$$

In Equation 3,

PE denotes polarization efficiency, $T_{||}$ is transmittance of light entering parallel to the transmissive axis of a polarizing film, and $T_\perp$ is transmittance of light entering perpendicular to the transmissive axis of the polarizing film.

The polarizing film 20 is a high-temperature elongation film of the polyolefin 21 and the dichroic dye 22. The high-temperature elongation film may be obtained by melt-blending a composition for a polarizing film including a polyolefin and a dichroic dye at greater than or equal to a melting point ($T_m$) of the polyolefin 21, extruding it to form a sheet, and then high temperature-elongating the sheet at less than or equal to the melting point of the polyolefin. The polyolefin 21 may have a melting point ($T_m$) of about 125° C. to about 170° C.

The composition for a polarizing film may include the polyolefin 21 and the dichroic dye 22, and the polyolefin 21 and the dichroic dye 22 may be respectively in a form of a solid. The composition for a polarizing film may have, for example, a solid content of greater than or equal to about 90 wt %, and in an embodiment, comprises no solvent.

The polarizing film 20 may be manufactured by melt-blending the composition for a polarizing film and elongating the same.

More specifically, the polarizing film 20 is for example manufactured through a step of melt-blending the composition for a polarizing film including a polyolefin and a dichroic dye, putting the melt mixture in a single-screw extruder, mixing it at a predetermined process temperature and at a predetermined screw speed, discharging it in a T-die connected to the extruder after a predetermined time, and passing it through a chill roll to form a sheet, and another step of elongating the sheet in a uniaxial direction at a high temperature.

The melt-blending of the composition for a polarization film may be performed at a temperature of less than or equal to about 300° C., and specifically, ranging from about 150° C. to about 300° C.

The elongation in a uniaxial direction may be performed at a temperature ranging from about 30° C. to about 200° C. at an elongation rate ranging from about 400% to about 1,400%. The elongation rate refers to a length ratio of after the elongation to before the elongation of the sheet, and means the elongation extent of the sheet after uniaxial elongation.

The polarizing film 20 may have a relative thin thickness of less than or equal to about 100 micrometers (μm), for example about 18 μm to about 50 μm. When the polarizing film 20 has a thickness within the range, it may be significantly thinner than a polarizing plate requiring a protective layer such as triacetyl cellulose (TAC), and may contribute to realizing a thin display device.

Hereinafter, an anti-reflective film according to an embodiment is described referring to drawings.

Figure 2:
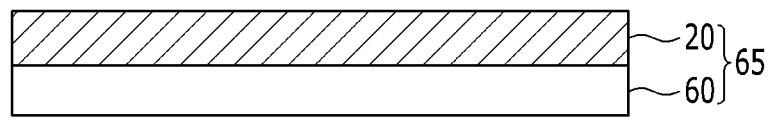
FIG. 2 is a cross-sectional view showing an anti-reflective film according to an embodiment.

FIG. 2 is a cross-sectional view showing an anti-reflective film according to an embodiment.

Referring to FIG. 2, an anti-reflective film according to an embodiment includes a phase retardation film 60 and the polarizing film 20.

The phase retardation film 60 may be a phase difference film, for example, a waveplate including a λ/4 plate. The phase retardation film 60 may circularly polarize light passing through the polarizing film 20 and thereby cause retardation of the light such that absorption and/or reflection of the light at the phase retardation film 60 is changed.

The polarizing film 20 is as described above.

Figure 3:
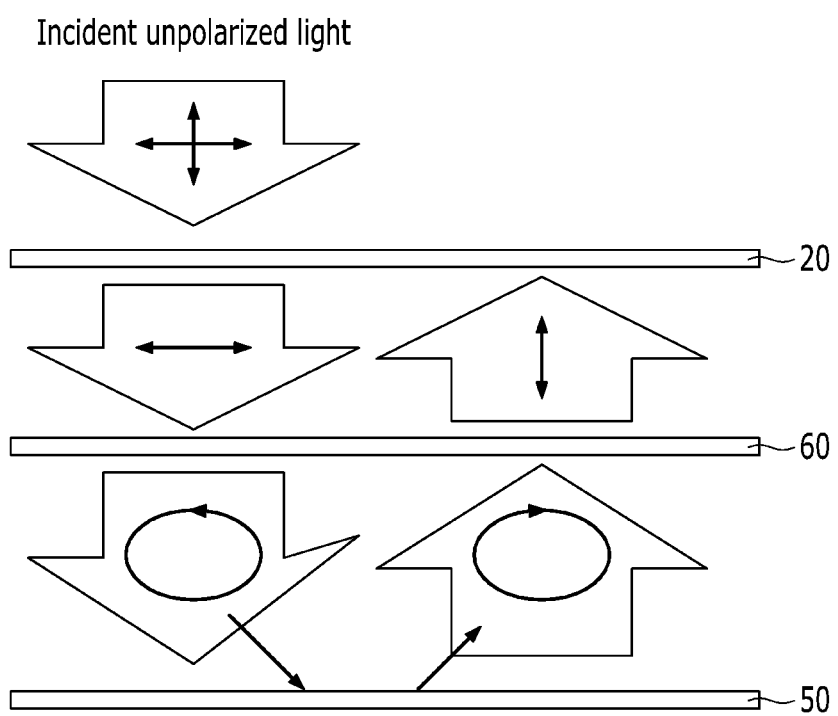
FIG. 3 is a schematic diagram showing the anti-reflection principle of an anti-reflective film.

FIG. 3 is a schematic diagram showing the anti-reflection principle of an anti-reflective film.

Referring to FIG. 3, when incident unpolarized light passes through the polarizing film 20, one polarizing perpendicular component of two polarizing perpendicular components, e.g., a first polarizing component, is transmitted through the polarizing film 20 and changed into polarized light, and the polarized light passes through the phase retardation film 60 such as a λ/4 plate and may be changed into circularly polarized light. The circularly polarized light is reflected in the display panel 50 including a substrate, an electrode, and the like, and the direction of the circularly polarized light is changed. When the circularly polarized light, the direction of which is changed, passes through the phase retardation film 60 again, the phase retardation film 60 transmits the other polarizing perpendicular component of the two polarizing perpendicular components, e.g., a second polarizing component, which is perpendicular to the first polarizing component. The second polarizing component may not pass through the polarizing film 20 and is not transmitted out of the display device, thus effectively preventing the reflection of external light.

The polarizing film 20 and the anti-reflective film 65 may be applied to various display devices.

The display device may be a liquid crystal display (LCD).

Figure 4:
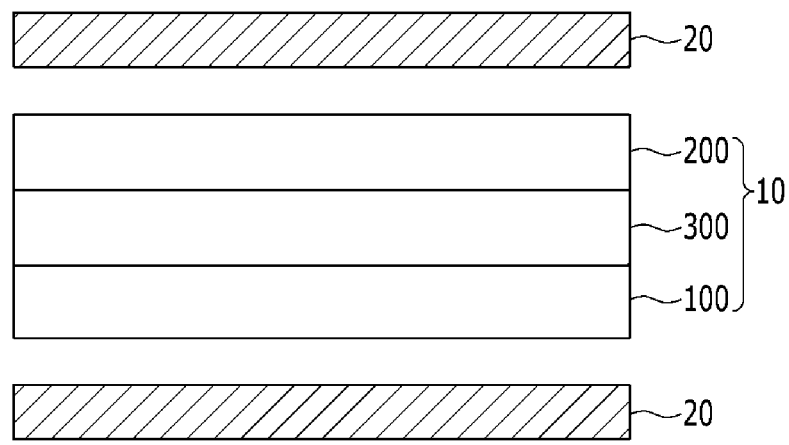
FIG. 4 is a cross-sectional view showing a liquid crystal display (LCD) according to an embodiment.

FIG. 4 is a cross-sectional view showing a liquid crystal display (LCD) according to an embodiment.

Referring to FIG. 4, the LCD according to some embodiments includes a liquid crystal display panel 10 and a polarizing film 20 disposed on both the lower part and the upper part of the liquid crystal display panel 10.

The liquid crystal display panel 10 may be a twist nematic (TN) mode panel, a patterned vertical alignment (PVA) mode panel, an in-plane switching (IPS) mode panel, an optically compensated bend (OCB) mode panel, and the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) formed on a substrate (not shown) and a first field generating electrode (not shown) connected thereto. The second display panel 200 may include, for example, a color filter (not shown) formed on the substrate and a second field generating electrode (not shown). However, it is not limited thereto, and the color filter may be included in the first display panel 100, while both the first electric field generating electrode and the second electric field generating electrode may be disposed in the first display panel 100.

The liquid crystal layer 300 may include a plurality of liquid crystal molecules. The liquid crystal molecules may have positive or negative dielectric anisotropy. When the liquid crystal molecules have positive dielectric anisotropy, the long axes thereof may be aligned substantially parallel to the surface of the first display panel 100 and the second display panel 200 when an electric field is not applied, and may be aligned substantially perpendicular to the surface of the first display panel 100 and the second display panel 200 when an electric field is applied. On the contrary, when the liquid crystal molecules have negative dielectric anisotropy, the long axes thereof may be aligned substantially perpendicular to the surface of the first display panel 100 and the second display panel 200 when an electric field is not applied, and may be aligned substantially parallel to the surface of the first display panel 100 and the second display panel 200 when an electric field is applied.

The polarizing film 20 is disposed on the outside of the liquid crystal display panel 10. Although it is shown to be disposed on the upper part and lower part of the liquid crystal display panel 10 in the drawing, it may be formed on either the upper part or the lower part of the liquid crystal display panel 10.

The polarizing film 20 includes a polyolefin and a dichroic dye that are the same as described above.

The display device may be an organic light emitting diode (OLED) display.

Figure 5:
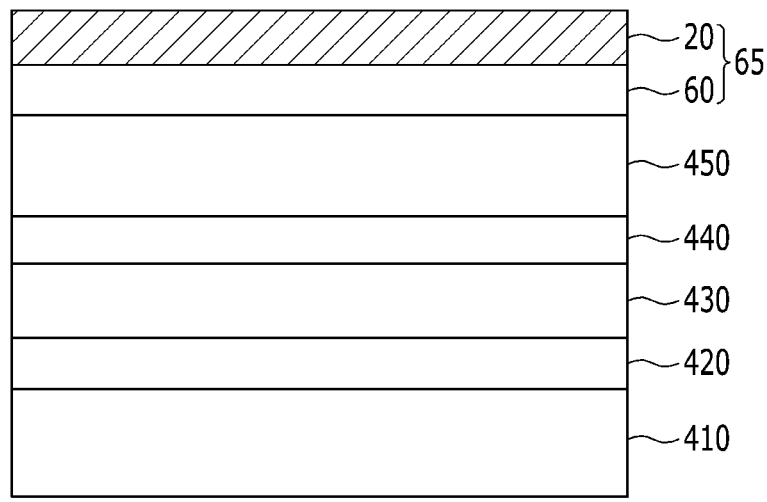
FIG. 5 is a cross-sectional view of an organic light emitting diode (OLED) display according to an embodiment.

FIG. 5 is a cross-sectional view showing an organic light emitting diode (OLED) display according to an embodiment.

Referring to FIG. 5, an organic light emitting diode (OLED) display according to an embodiment includes a base substrate 410, a lower electrode 420, an organic emission layer 430, an upper electrode 440, an encapsulation substrate 450, and an anti-reflective film 65.

The base substrate 410 may be formed of glass or plastic.

Either of the lower electrode 420 or the upper electrode 440 may be an anode, while the other is a cathode. The anode is an electrode where holes are injected. It is formed of a transparent conductive material having a high work function and externally transmitting entered light, for example, indium-doped tin oxide (ITO) or indium-doped zinc oxide (IZO). The cathode is an electrode where electrons are injected. It is formed of a conducting material having a low work function and having no influence on an organic material, selected from, for example, aluminum (Al), calcium (Ca), and barium (Ba).

The organic emission layer 430 includes an organic material emitting light when a voltage is applied between the lower electrode 420 and the upper electrode 440.

An auxiliary layer (not shown) may be further included between the lower electrode 420 and the organic emission layer 430 and between the upper electrode 440 and the organic emission layer 430. The auxiliary layer may include a hole transport layer, a hole injection layer, an electron injection layer, and an electron transport layer for balancing electrons and holes.

The encapsulation substrate 450 may be made of glass, metal, or a polymer. The lower electrode 420, the organic emission layer 430, and the upper electrode 440 are sealed to prevent moisture and/or oxygen from flowing in.

The anti-reflective film 65 may include a phase retardation film 60 and a polarizing film 20, as described above.

The phase retardation film 60 may circularly polarize light passing through the polarizing film 20 and generate a phase difference, and thus have an influence on reflection and absorption of the light. The phase retardation film 460 may be omitted depending on a particular embodiment.

The anti-reflective film 65 may be disposed at a light-emitting side. For example, the anti-reflective film 65 may be disposed outside of the base substrate 410 in a bottom emission type in which light emits from the base substrate 410, and outside of the encapsulation substrate 450 in a top emission type in which light emits from the encapsulation substrate 450.

The polarizing film 20 may play a role of a light absorption layer absorbing external light and thus prevent display characteristic deterioration due to reflection of the external light.

Hereinafter, the present disclosure is illustrated in more detail with reference to examples. However, these examples are exemplary, and the present disclosure is not limited thereto.

Evaluation 1: Melt Flow Index

The melt flow index of a commercially-available polyolefin is measured at 190° C. under a load (kgf) of 2.16 kg.

Evaluation 2: Zero Shear Viscosity and Complex Viscosity

The commercially-available polyolefin is press-molded to obtain a 1.0 mm-thick sample by being preheated at 230° C. for 3 minutes, heated at 230° C. for 2 minutes under a pressure of 100 kgf/cm², and then cooled down to 20° C. for 5 minutes under a pressure of 100 kgf/cm².

The sample is mounted between upper and lower measuring plates of Physica MCR 501 (Anton Paar Corp. Germany) equipment. In order to obtain the zero shear viscosity of the sample, the frequency sweep of the sample is measured at 210° C. in an angular frequency ($\omega$, rad/s) range of $0.1 \leq \omega \leq 300$. Herein, a parallel plate having a diameter, $\varphi$ of 8 mm is used, the sample is formed to have a thickness of about 1.0 mm, and a strain is set to be about 1%. The zero shear viscosity is obtained by using a cross model of Equation 4 through an analysis program installed in a rheometer, and the results are provided in FIG. 6. FIG. 6 shows the complex viscosity profiles of the samples No. 1 to 8.

$$\eta^*(\omega) = \frac{\eta_0^* - \eta_\infty^*}{1 + (K\omega)^m} + \eta_\infty^* \qquad \text{Equation 4}$$

In Equation 4, $\eta_0$ is viscosity at angular frequency of 0, $\eta_\infty$ is viscosity at infinite angular frequency, K is a time constant related to the relaxation, and m is a dimensionless exponent.

Evaluation 3: Yield Stress

The yield stress is obtained by measuring the amplitude sweep of a sample made in the same method as Evaluation 2 with Physica MCR 501 equipment (manufactured by Anton Paar Corp., Germany) at 210° C. (±3° C.) in a range of $10 \leq$ stress $(\tau) \leq 100{,}000$. Herein, a parallel plate having a diameter, $\varphi$ of 8 mm is used, the sample has a thickness of about 1.0 mm, and an angular frequency is set to 1 rad/s.

The results are provided in Table 1.

TABLE 1

| Sample No. | Polyolefin | Manufacture | MFI (g/10 min) | Zero shear viscosity (Pa · s) | Yield stress (Pa) |
| --- | --- | --- | --- | --- | --- |
| 1 | HF351 (PP) | Samsung Total Petrochemicals Co., Ltd. | 3 | 17,343 | 8680.99 |
| 2 | HU300/RP5050 (PP/PE-PP) (mixed in a weight ratio of 6/4) | Samsung Total Petrochemicals Co., Ltd./ Polymirae Co., Ltd. | 5 | 11,132 | 4097.93 |
| 3 | HU300/RJ581 (PP/PE-PP) (mixed in a weight ratio of 6/4) | Samsung Total Petrochemicals Co., Ltd. | 7.8 | 8271.6 | 3157.11 |
| 4 | RP5050 (PE-PP) | Polymirae Co., Ltd. | 8 | 3224.5 | 4090.22 |
| 5 | HM2089 (PP) | Polymirae Co., Ltd. | 9 | 4400.5 | 3472.35 |
| 6 | HP521M/ RJ581 (PP/PP) (mixed in a 6/4 weight ratio) | Polymirae Co., Ltd./Samsung Total Petrochemicals Co., Ltd. | 10.8 | 2607 | 2691.1 |
| 7 | HU300 (PP) | Samsung Total Petrochemicals Co., Ltd. | 3 | 20967 | 7436.65 |
| 8 | RJ581 (PE-PP) | Samsung Total Petrochemicals Co., Ltd. | 15 | 1514.2 | 1456.95 |

In Table 1, PP denotes polypropylene and PE-PP denotes ethylene-propylene copolymer.

Referring to the results of Table 1, the samples No. 1 to 7 show a melt flow index of 3 to 11, while the sample No. 8 shows a melt flow index out of the range. As for the zero shear viscosity, the samples No. 1 to 6 show zero shear viscosity ranging from about 2600 Pa·s to about 17400 Pa·s, and the samples No. 7 and 8 show zero shear viscosity out of the range. As for the yield stress, the samples No. 1 to 7 show yield stress ranging from about 2600 Pa to about 8700 Pa, and the sample No. 8 shows yield stress out of the range.

Referring to the complex viscosity results in FIG. 6, the samples No. 1 to 6 have complex viscosity values which fall between the two viscosity profiles marked with a solid line. In other words, the complex viscosity of the samples No. 1 to 6 satisfies Equation 1.

$$\frac{2600}{1+(k_1\omega)^{m_1}} \leq \eta^* \leq \frac{17400}{1+(k_2\omega)^{m_2}} \qquad \text{Equation 1}$$

In Equation 1, $\omega$ is an angular frequency of a rotational rheometer, $k_1$ is a constant of about 0.108 to about 0.132, $k_2$ is a constant of about 0.738 to about 0.902, $m_1$ ranges from about 0.477 to about 0.583, and $m_2$ ranges from about 0.522 to about 0.638.

On the contrary, the samples No. 7 and 8 show complex viscosity values outside of the area defined by the two viscosity profiles marked with a solid line.

Manufacture of Polarizing Film

Examples 1 to 6 and Comparative Examples 1 and 2

100 parts by weight of each mixture of the polyolefin samples No. 1 to 8 and 1 part by weight of dichroic dyes represented by Chemical Formulae 1A to 1D are mixed to prepare compositions for a polarizing film. The compositions for a polarizing film respectively using the samples No. 7 and 8 are Comparative Examples 1 and 2, while the compositions for a polarizing film respectively using the samples No. 1 to 6 are Examples 1 to 6.

Each dichroic dye is used as follows: 0.200 parts by weight of a dichroic dye represented by Chemical Formula 1A (yellow, $\lambda_{max}$=385 nanometers (nm), dichroic ratio=7.0), 0.228 parts by weight of a dichroic dye represented by Chemical Formula 1B (yellow, $\lambda_{max}$=455 nm, dichroic ratio=6.5), 0.286 parts by weight of a dichroic dye represented by the following Chemical Formula 1C (red, $\lambda_{max}$=555 nm, dichroic ratio=5.1), and 0.286 parts by weight of a dichroic dye represented by Chemical Formula 1 D (blue, $\lambda_{max}$=600 nm, dichroic ratio=4.5).

The composition for a polarizing film is melt-mixed at about 230° C. by using a single-screw extruder (Collin, Germany). Subsequently, the melt-mixed mixture is discharged in a T-die connected to the front end of the extruder and passed through a chill roll, forming a sheet. The sheet (thickness: about 170 to 195 μm) is 1100% elongated in a uniaxial direction using a tensile tester made by Instron at 115° C., forming polarizing films.

Evaluation 4: Light Transmittance and Polarization Efficiency

Light transmittance (Ts) and polarization efficiency (PE) of the polarizing films according to Examples 1 to 6 and Comparative Examples 1 and 2 in a visible ray region are evaluated.

The light transmittance is obtained by respectively measuring light transmittance of a polarizing film regarding light parallel to a transmittance axis of the polarizing film and light transmittance of the polarizing film regarding light perpendicular to the transmittance axis of the polarizing film with a UV-VIS spectrophotometer (V-7100, JASCO).

The polarization efficiency is obtained using the measured light transmittance.

$$PE\ (\%) = [(T_\| - T_\perp)/(T_\| + T_\perp)]^{1/2} \times 100 \quad \text{[Equation 3]}$$

In Equation 3,

PE denotes polarization efficiency, $T_\|$ is transmittance of light entering parallel to the transmissive axis of a polarizing film, and $T_\perp$ is transmittance of light entering perpendicular to the transmissive axis of the polarizing film.

The polarization efficiency measured at light transmittance of 41.9% and haze are provided in Table 2.

The haze of the polarizing films of Examples 1 to 6 and Comparative Examples 1 and 2 is measured by using a hazemeter, NDH7000SP (Nippon Denshoku, Japan).

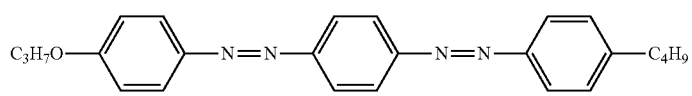

Chemical Formula 1A

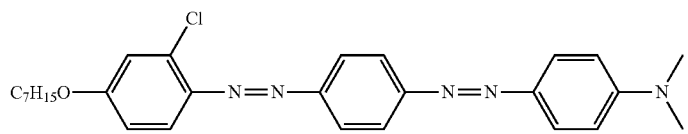

Chemical Formula 1B

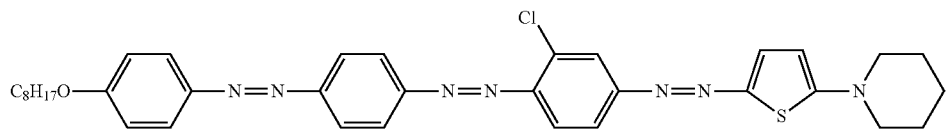

Chemical Formula 1C

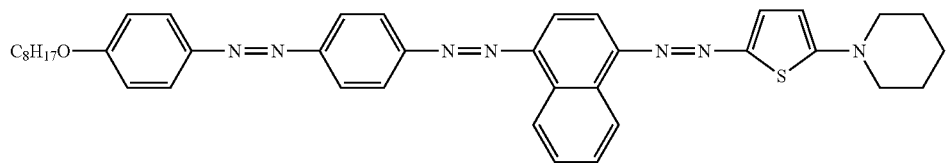

Chemical Formula 1D

TABLE 2

| | Polarization efficiency (PE, %) (@ transmittance: 41.9%) | Haze (%) |
|---|---|---|
| Example 1 | 98.70 | 3.2 |
| Example 2 | 98.74 | 4.3 |
| Example 3 | 98.57 | 0.95 |
| Example 4 | 98.60 | 3.33 |
| Example 5 | 98.53 | 2.37 |
| Example 6 | 98.67 | 0.84 |
| Comparative Example 1 | 98.33 | 5.54 |
| Comparative Example 2 | 97.31 | 0.60 |

Referring to Table 2, the polarizing films according to Examples 1 to 6 all showed high polarization efficiency of greater than or equal to 98% at light transmittance of 41.9% and sufficiently low haze compared with the ones according to Comparative Examples 1 and 2. On the other hand, the polarizing film according to Comparative Example 2 showed low polarization efficiency.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarizing film comprising a high-temperature elongation film comprising:
   a polyolefin and
   a dichroic dye,
   wherein the polyolefin has a zero shear viscosity ($\eta_0$) ranging from about 2600 Pa·s to about 17400 Pa·s at a temperature of about 210° C. (±3° C.), and the polyolefin has a yield stress ranging from about 2600 Pa to about 8700 Pa.

2. The polarizing film of claim 1, wherein the polyolefin has a zero shear viscosity ranging from about 2600 Pa·s to about 12000 Pa·s at a temperature of about 210° C. (±3° C.).

3. The polarizing film of claim 1, wherein the polyolefin has a zero shear viscosity ranging from about 2600 Pa·s to about 8500 Pa·s at a temperature of about 210° C. (±3° C.).

4. The polarizing film of claim 1, wherein the polyolefin has a complex viscosity ($\eta^*$, Pa·s) satisfying Equation 1:

$$\frac{2600}{1+(k_1\omega)^{m_1}} \leq \eta^* \leq \frac{17400}{1+(k_2\omega)^{m_2}} \quad \text{Equation 1}$$

wherein, in Equation 1,
$\omega$ is a numeral value of an angular frequency of a rotational rheometer,
$k_1$ is a constant of about 0.108 to about 0.132,
$k_2$ is a constant of about 0.738 to about 0.902,
$m_1$ ranges from about 0.477 to about 0.583, and
$m_2$ ranges from about 0.522 to about 0.638.

5. The polarizing film of claim 1, wherein the polyolefin has a complex viscosity ($\eta^*$, Pa·s) satisfying Equation 1-1:

$$\frac{2600}{1+(k_1\omega)^{m_1}} \leq \eta^* \leq \frac{12000}{1+(k_2\omega)^{m_2}} \quad \text{Equation 1-1}$$

wherein, in Equation 1-1,
$\omega$ is a numeral value of an angular frequency of a rotational rheometer,
$k_1$ is a constant of about 0.108 to about 0.132,
$k_2$ is a constant of about 1.071 to about 1.309,
$m_1$ ranges from about 0.477 to about 0.583, and
$m_2$ ranges from about 0.468 to about 0.572.

6. The polarizing film of claim 1, wherein the polyolefin has a complex viscosity ($\eta^*$, Pa·s) satisfying Equation 1-2:

$$\frac{2600}{1+(k_1\omega)^{m_1}} \leq \eta^* \leq \frac{8500}{1+(k_2\omega)^{m_2}} \quad \text{Equation 1-2}$$

wherein, in Equation 1-2,
$\omega$ is a numeral value of an angular frequency of a rotational rheometer,
$k_1$ is a constant of about 0.108 to about 0.132,
$k_2$ is a constant of about 0.603 to about 0.737,
$m_1$ ranges from about 0.477 to about 0.583, and
$m_2$ ranges from about 0.54 to about 0.66.

7. The polarizing film of claim 1, wherein the polyolefin has a yield stress ranging from about 2691 Pa to about 8681 Pa.

8. The polarizing film of claim 1, wherein the polyolefin comprises polypropylene, a polyethylene copolymer, a polypropylene copolymer, a polyethylene-polypropylene copolymer, or a combination thereof.

9. The polarizing film of claim 1, wherein
   the polyolefin is a mixture of polypropylene (PP) and a polyethylene-polypropylene (PE-PP) copolymer, and
   the polyethylene and polypropylene (PE-PP) copolymer comprises ethylene in an amount of about 1 to about 50 wt %, based on the total weight of the copolymer.

10. The polarizing film of claim 1, wherein the polyolefin has a melt flow index (MFI) ranging from about 3 g/10 min to about 11 g/10 min.

11. The polarizing film of claim 9, wherein the polypropylene (PP) has a melt flow index (MFI) ranging from about 3 g/10 min to about 10 g/10 min, and the polyethylene-polypropylene copolymer (PE-PP) has a melt flow index (MFI) of about 5 g/10 min to about 16 g/10 min.

12. The polarizing film of claim 9, wherein the polyolefin comprises the polypropylene and the polyethylene-polypropylene copolymer in a weight ratio of about 1:9 to about 9:1.

13. The polarizing film of claim 1, wherein the dichroic dye is dispersed into the polyolefin, and the polyolefin is elongated in a uniaxial direction about 400% to about 1300%.

14. The polarizing film of claim 1, which has haze of less than or equal to about 5%.

15. The polarizing film of claim 14, which has haze ranging from about 0.5% to about 3.5%.

16. The polarizing film of claim 1, wherein the polarizing film has a dichroic ratio ranging from about 2 to about 14 in a visible ray wavelength region ranging from about 380 nm to about 780 nm.

17. The polarizing film of claim 1, wherein the dichroic dye is present in an amount of about 0.1 to about 10 parts by weight based on 100 parts by weight of the polyolefin.

18. The polarizing film of claim 17, wherein the dichroic dye is present in an amount of about 0.5 to about 5 parts by weight based on 100 parts by weight of the polyolefin.

19. The polarizing film of claim 1, wherein the polarization film has polarization efficiency of greater than or equal to about 95%.

20. The polarizing film of claim 19, wherein the polarization film has polarization efficiency of about 95% to about 99.9%.

21. An anti-reflective film comprising:
    the polarizing film of claim 1, and
    a phase retardation film.

22. A display device comprising the polarizing film according to claim 20.

23. A display device comprising the anti-reflective film according to claim 21.

24. A composition for a polarizing film comprising a polyolefin and a dichroic dye,
    wherein the polyolefin has zero shear viscosity ($\eta_0$) ranging from about 2600 Pa·s to about 17400 Pa·s at a temperature of about 210° C. (±3° C.), and the polyolefin has a yield stress ranging from about 2600 Pa to about 8700 Pa.

25. The composition of claim 24, wherein the polyolefin has zero shear viscosity ranging from about 2600 Pa·s to about 8500 Pa·s at a temperature of about 210° C. (±3° C.).

26. The composition of claim 24, wherein the polyolefin has complex viscosity ($\eta^*$, Pa·s) satisfying Equation 1:

$$\frac{2600}{1+(k_1\omega)^{m_1}} \le \eta^* \le \frac{17400}{1+(k_2\omega)^{m_2}} \qquad \text{Equation 1}$$

wherein, in Equation 1,
 $\omega$ is a numeral value of an angular frequency of a rotational rheometer,
 $k_1$ is a constant of about 0.108 to about 0.132,
 $k_2$ is a constant of about 0.738 to about 0.902,
 $m_1$ ranges from about 0.477 to about 0.583, and
 $m_2$ ranges from about 0.522 to about 0.638.

27. The composition of claim 24, wherein the polyolefin has complex viscosity ($\eta^*$, Pa·s) satisfying Equation 1-1:

$$\frac{2600}{1+(k_1\omega)^{m_1}} \le \eta^* \le \frac{12000}{1+(k_2\omega)^{m_2}} \qquad \text{Equation 1-1}$$

wherein in Equation 1-1,
 $\omega$ is a numeral value of an angular frequency of a rotational rheometer,
 $k_1$ is a constant of about 0.108 to about 0.132,
 $k_2$ is a constant of about 1.071 to about 1.309,
 $m_1$ ranges from about 0.477 to about 0.583, and
 $m_2$ ranges from about 0.468 to about 0.572.

28. The composition of claim 24, wherein the polyolefin has complex viscosity ($\eta^*$, Pa·s) satisfying Equation 1-2:

$$\frac{2600}{1+(k_1\omega)^{m_1}} \le \eta^* \le \frac{8500}{1+(k_2\omega)^{m_2}} \qquad \text{[Equation 1-2]}$$

wherein, in Equation 1-2,
 $\omega$ is a numeral value of an angular frequency of a rotational rheometer,
 $k_1$ is a constant of about 0.108 to about 0.132,
 $k_2$ is a constant of about 0.603 to about 0.737,
 $m_1$ ranges from about 0.477 to about 0.583, and
 $m_2$ ranges from about 0.54 to about 0.66.

29. The composition of claim 24, wherein the polyolefin has yield stress ranging from about 2691 Pa to about 8681 Pa.

30. The composition of claim 24, wherein the polyolefin comprises polypropylene, a polyethylene copolymer, a polypropylene copolymer, a polyethylene-polypropylene copolymer, or a combination thereof.

31. The composition of claim 30, wherein the polyolefin is a mixture of polypropylene (PP) and a polyethylene-polypropylene (PE-PP) copolymer,
 wherein the polyethylene and polypropylene (PE-PP) copolymer comprises ethylene in an amount of about 1 to about 50 wt % based on the weight of the copolymer.

32. The composition of claim 24, wherein the polyolefin has a melt flow index (MFI) ranging from about 3 g/10 min to about 11 g/10 min.

33. The composition of claim 31, wherein the polypropylene (PP) has a melt flow index (MFI) ranging from about 3 g/10 min to 10 g/10 min, and
 the polyethylene-polypropylene copolymer (PE-PP) has a melt flow index (MFI) ranging from about 5 g/10 min to about 16 g/10 min.

34. The composition of claim 24, which has a solid content of greater than or equal to about 90 wt %.

35. The composition of claim 24, which contains no solvent.

* * * * *